US011396367B2

(12) United States Patent
Walliser

(10) Patent No.: US 11,396,367 B2
(45) Date of Patent: Jul. 26, 2022

(54) VORTEX REDUCTION APPARATUS FOR USE WITH AIRFOILS

(71) Applicant: The Boeing Company, Chicago, IL (US)

(72) Inventor: Eric W. Walliser, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 515 days.

(21) Appl. No.: 16/406,867

(22) Filed: May 8, 2019

(65) Prior Publication Data
US 2020/0354040 A1 Nov. 12, 2020

(51) Int. Cl.
*B64C 23/06* (2006.01)
*B64C 27/82* (2006.01)
*B64C 3/58* (2006.01)

(52) U.S. Cl.
CPC .............. *B64C 23/065* (2013.01); *B64C 3/58* (2013.01); *B64C 27/82* (2013.01)

(58) Field of Classification Search
CPC ........... B64C 3/58; B64C 23/00; B64C 23/02; B64C 23/06; B64C 23/065; B64C 23/069; B64C 23/072; B64C 23/076; B64C 27/82
See application file for complete search history.

(56) References Cited

U.S. PATENT DOCUMENTS

| | | | | |
|---|---|---|---|---|
| 2,075,817 A | * | 4/1937 | Loerke | B64C 23/065 244/130 |
| 2,477,461 A | * | 7/1949 | Lee | B64C 23/065 244/199.3 |
| 3,596,854 A | * | 8/1971 | Haney, Jr. | B64C 23/065 244/199.3 |
| 3,984,070 A | | 10/1976 | Patterson, Jr. | |
| 3,997,132 A | * | 12/1976 | Erwin | B64C 23/065 244/199.3 |
| 4,334,828 A | | 6/1982 | Moffitt | |
| 4,362,280 A | * | 12/1982 | McCambridge | B64C 39/02 239/14.1 |
| 4,917,332 A | | 4/1990 | Patterson, Jr. | |
| 5,297,764 A | * | 3/1994 | Haney | B64C 23/065 244/199.3 |

(Continued)

FOREIGN PATENT DOCUMENTS

RU 2389649 C1 * 5/2010

OTHER PUBLICATIONS

Brocklehurst et al., "A review of helicopter rotor blade tip shapes," Progress in Aerospace Sciences 56(2013) 35-74, dated Aug. 29, 2012, 40 pages.

(Continued)

*Primary Examiner* — Richard R. Green
*Assistant Examiner* — Michael A. Fabula
(74) *Attorney, Agent, or Firm* — Hanley, Flight & Zimmerman, LLC

(57) ABSTRACT

Vortex reduction apparatus for use with airfoils are disclosed. An example vortex reduction apparatus includes a housing to couple to a tip of an airfoil. The housing defines a volute fluid flow passageway between an inlet and an outlet. The volute fluid flow passageway is structured to induce a rotational fluid flow in a first rotational direction opposite a second rotational direction of a shed vortex induced at the tip of the airfoil during flight.

20 Claims, 13 Drawing Sheets

(56) References Cited

U.S. PATENT DOCUMENTS

| | | | | |
|---|---|---|---|---|
| 5,934,612 | A | 8/1999 | Gerhardt | |
| 6,474,604 | B1* | 11/2002 | Carlow | B64C 39/062 |
| | | | | 244/198 |
| 6,892,988 | B2* | 5/2005 | Hugues | B64C 23/065 |
| | | | | 244/199.4 |
| 7,644,804 | B2* | 1/2010 | Harman | F15D 1/02 |
| | | | | 181/279 |
| 8,133,025 | B2* | 3/2012 | Li | F03D 80/00 |
| | | | | 416/91 |
| 2004/0195461 | A1* | 10/2004 | Hugues | B64C 23/065 |
| | | | | 244/199.2 |
| 2005/0269458 | A1* | 12/2005 | Harman | F15D 1/009 |
| | | | | 244/199.4 |

OTHER PUBLICATIONS

Hwang et al., "Assessment of Tip Shape Effect on Rotor Aerodynamic Performance in Hover," International Journal of Aeronautical and Space Sciences, 16920, 295-310 (2015), dated May 27, 2015, 16 pages.

Yeager, Jr. et al., "Wind-Tunnel Investigation of the Effects of Blade Tip Geometry on the Interaction of Torsional Loads and Performance for an Articulated Helicopter Rotor," NASA Technical Paper 1926, AVRADCOM Technical Report 81-B-5, dated Dec. 22, 1981, 65 pages.

* cited by examiner

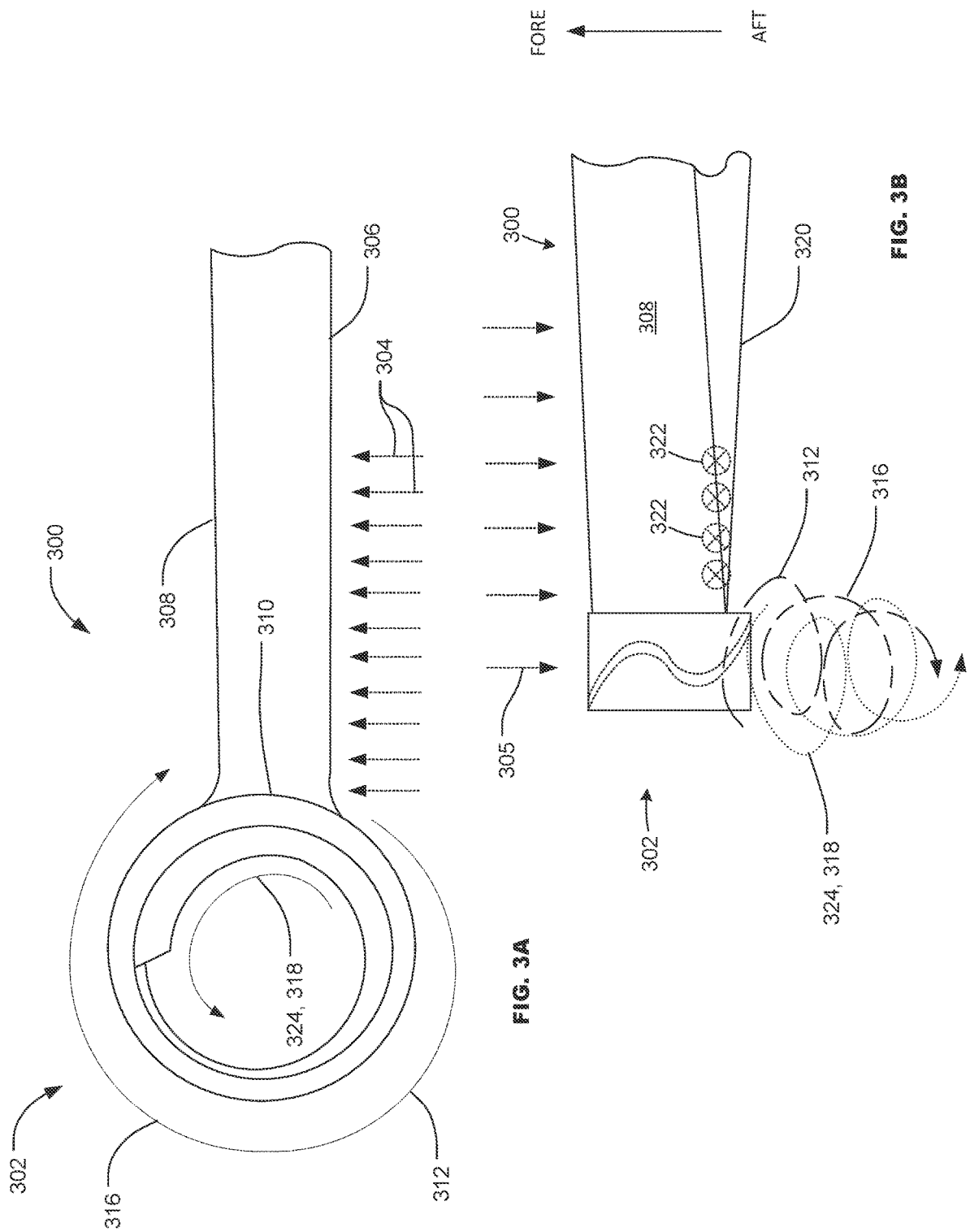

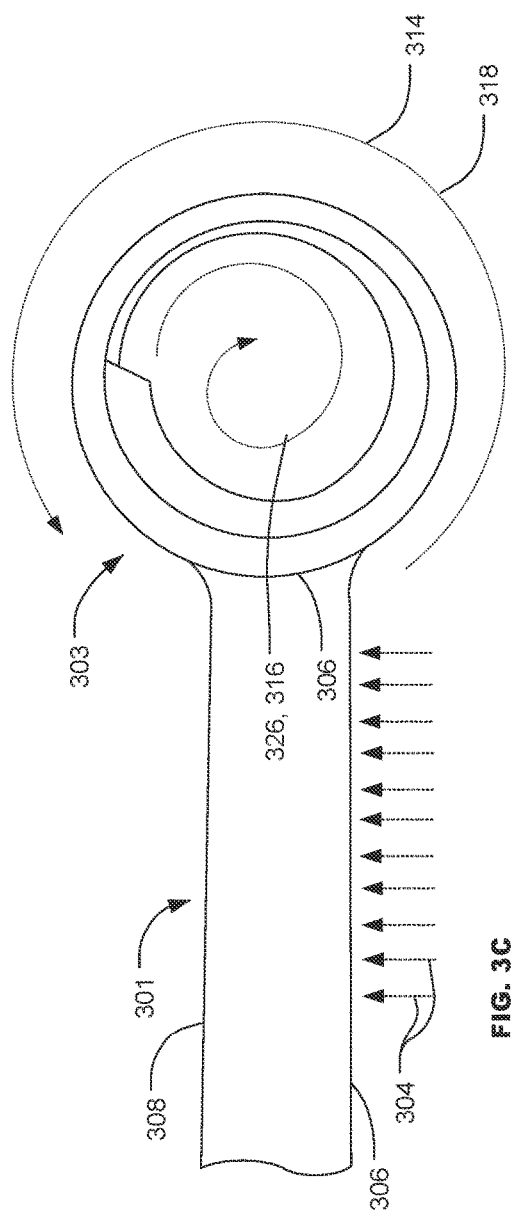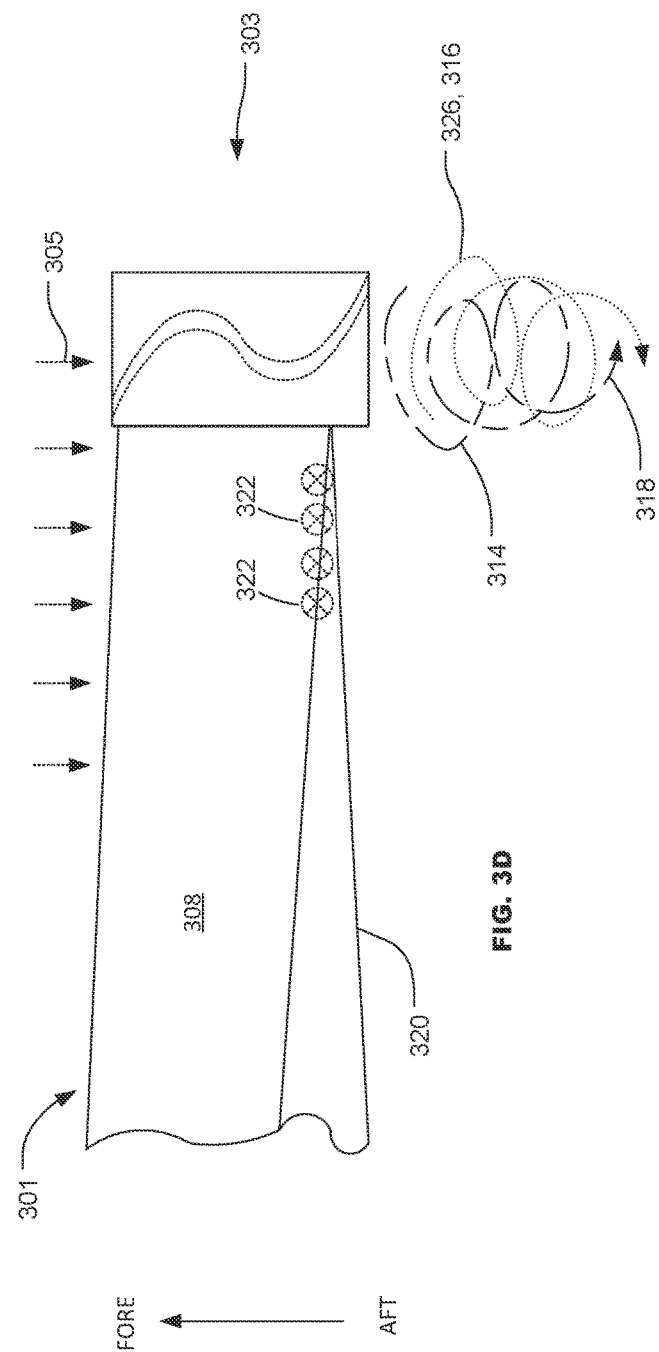

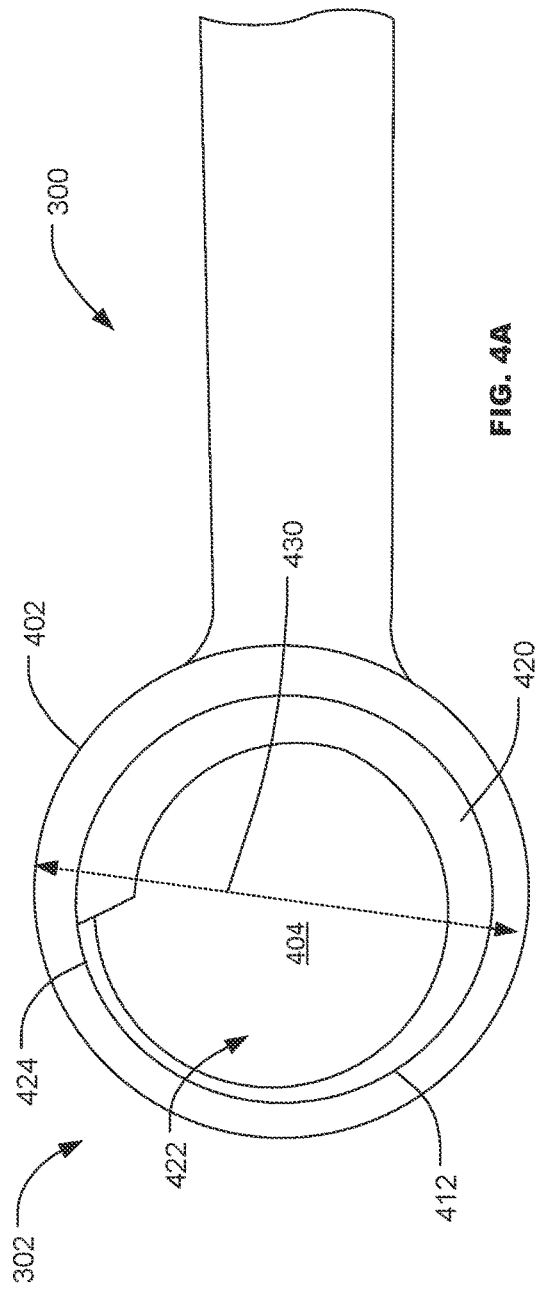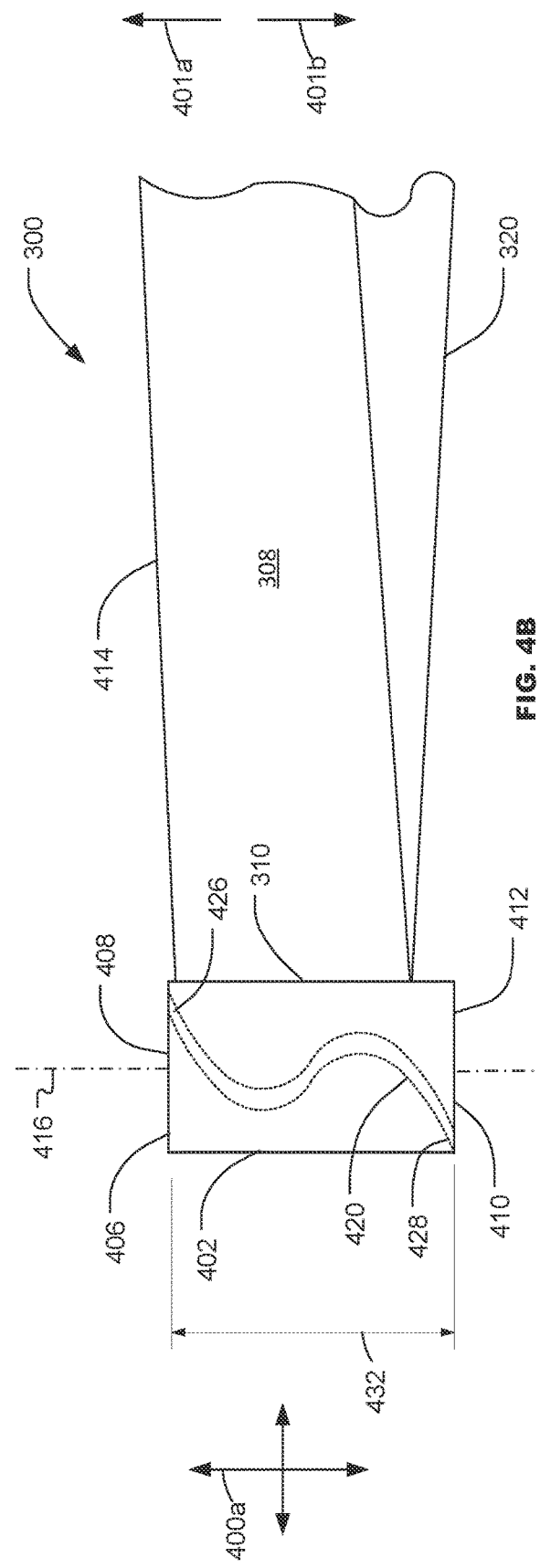

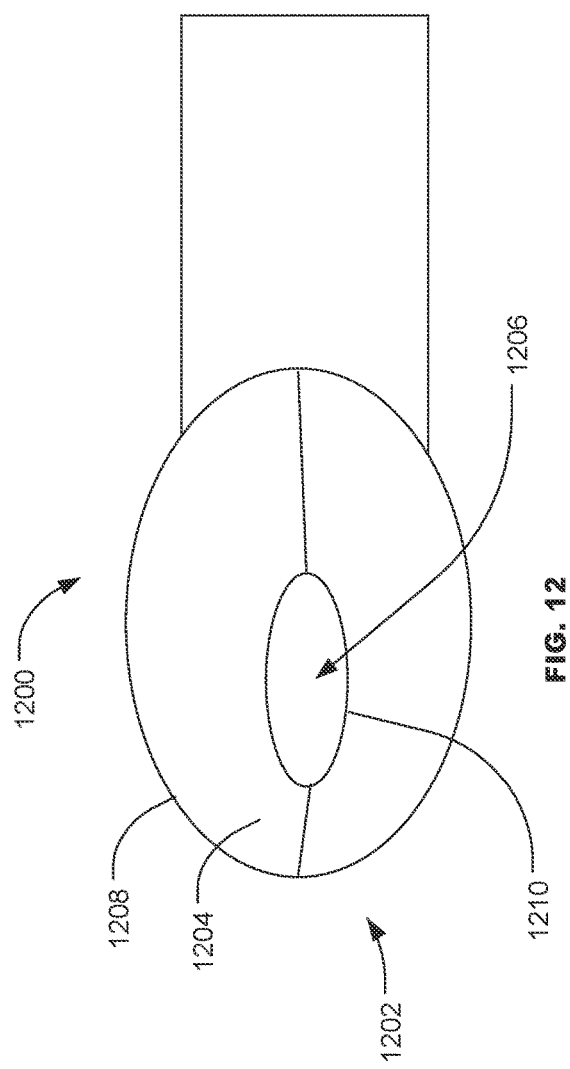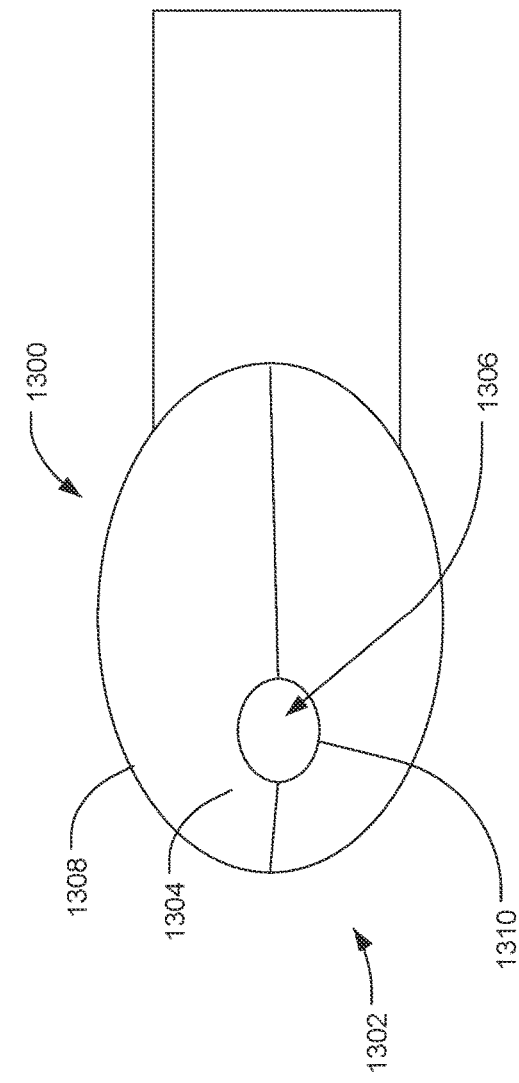

US 11,396,367 B2

VORTEX REDUCTION APPARATUS FOR USE WITH AIRFOILS

FIELD OF DISCLOSURE

The present disclosure relates generally to aircraft and, more particularly, to vortex reduction apparatus for use with airfoils.

BACKGROUND

An airfoil (wing or rotor blade) produces lift by using energy of free airstream. When an airfoil produces lift, air pressure on a lower surface of the airfoil is greater than air pressure on the upper surface of the airfoil. This pressure differential can generate vortices at a tip of a wing, which reduce an amount of lift produced by the wing. To increase lift, an angle of attack of the airfoil is increased. However, increasing an angle of attack of an airfoil increases drag generated by the airfoil.

SUMMARY

An example vortex reduction apparatus includes a housing to couple to a tip of an airfoil. The housing defines a volute fluid flow passageway between an inlet and an outlet. The volute fluid flow passageway is structured to induce a rotational fluid flow in a first rotational direction opposite a second rotational direction of a shed vortex induced at the tip of the airfoil during flight.

An example vortex reduction apparatus includes a housing to couple to an outboardmost portion of the airfoil. The housing defines a cavity between a first end of the housing and a second end of the housing. One or more volute vanes are positioned in the cavity and at least partially extending between the first end and the second end of the housing. The vortex reduction apparatus impart a rotational velocity to airflow flowing through the cavity by employing a speed of airflow intrinsic to at least one of a forward velocity of the airfoil or a blade rotation of the airfoil without receiving power from an energy source.

An example vortex reduction apparatus includes means for defining a cavity between an inlet and an outlet. The vortex reduction apparatus includes means for imparting rotational fluid flow to fluid flowing through the means for defining the cavity between the inlet and the outlet. The means for imparting rotational fluid flow to induce a rotational flow fluid in a first rotational direction opposite to a second rotational direction of a tip vortex induced at a tip of an airfoil during flight.

BRIEF DESCRIPTION OF THE DRAWINGS

FIG. 3A is a left side, rear view of an example airfoil and vortex generating apparatus disclosed herein that can implement the example aircraft of FIG. 1 or the example aircraft of FIG. 2.

FIG. 3B is a top view of the example airfoil of FIG. 3A.

FIG. 3C is a right side, rear view of an example airfoil and vortex generating apparatus disclosed herein that can implement the example aircraft of FIG. 1 or the example aircraft of FIG. 2.

FIG. 3D is a top view of the example airfoil of FIG. 3C.

FIG. 4A is a left side, rear view of an example airfoil and vortex generating apparatus similar to FIG. 3A.

FIG. 4B is a top view of the example airfoil of FIG. 4A.

FIGS. 12 and 13 are left side, rear views of other example airfoils and vortex reduction apparatus disclosed herein.

Figure 1:
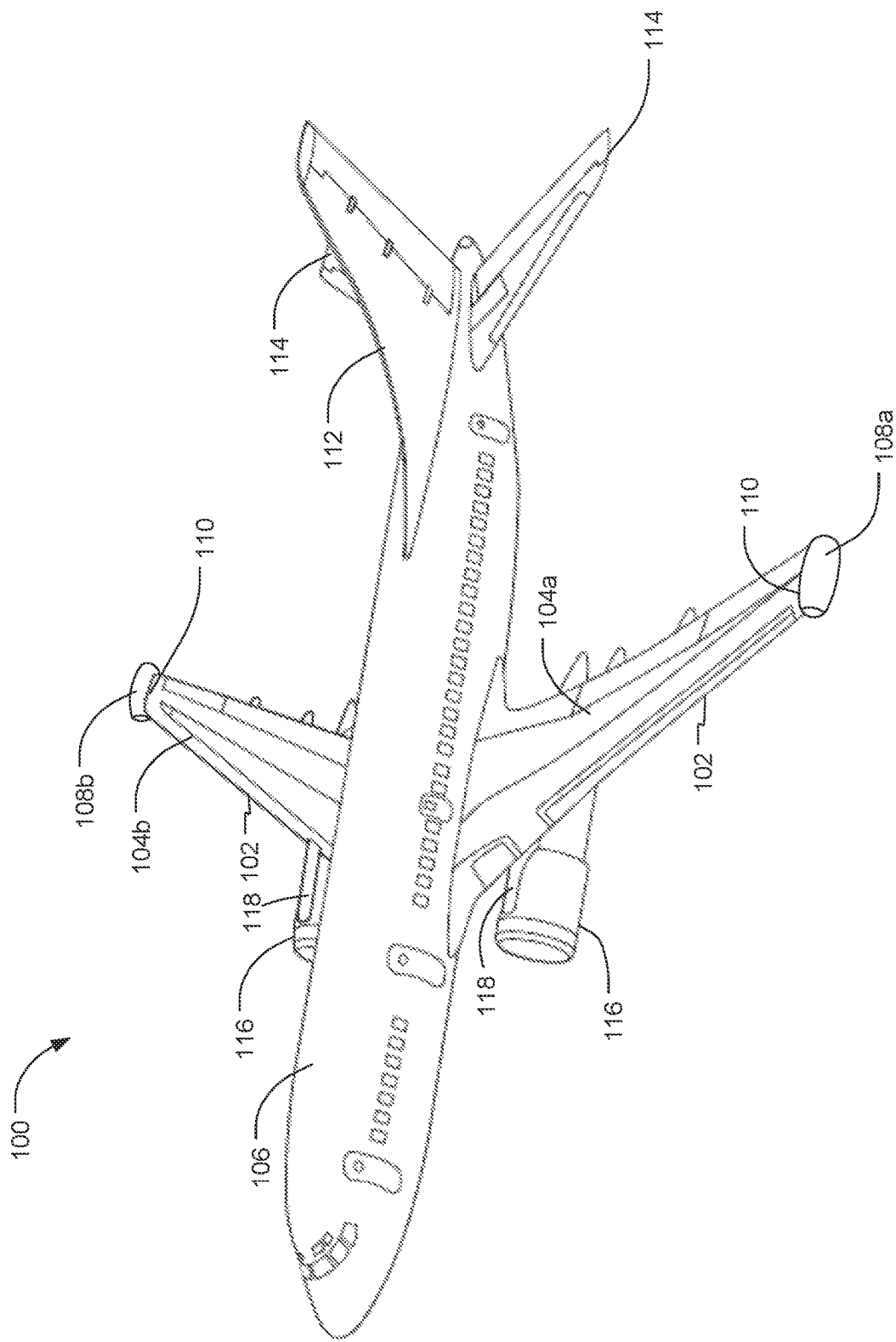
FIG. 1 is an illustration of an example aircraft implemented with a vortex reduction apparatus in accordance with teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

An airfoil (e.g., a wing or rotor blade) generates lift via an imbalance of pressure between an upper surface of the airfoil and a lower surface of the airfoil. However, the pressure imbalance that produces lift creates wingtip vortices at terminating ends (wing tips, rotor blade tips) of the airfoil. For example, when an airfoil produces lift, air pressure on a lower surface of the airfoil is greater than air pressure on the upper surface of the airfoil. Air particles move from the lower wing surface around the wing tip to the upper surface (from the region of high pressure to the region of low pressure). As a result, the high-pressure air below the wing tends to flow or spill upward to the low pressure area on the upper surface adjacent the tip of the airfoil.

The forward motion of the airfoil causes the upward spill of air to spin or rotate off the wing tip. Thus, the lateral flow imparts a rotational velocity to air at the airfoil tips. Such rotational airflow produces vortices at the tip of the airfoil. The vortices deflect airflow behind the wing downwardly, also known as downwash. The vortices or downwash reduce air pressure along a rear edge of the airfoil, which increases a pressure drag on the airplane (e.g., vortex drag). As a result, the vortices reduce an amount of lift produced by the airfoil. To account for the lost lift, an angle of attack of the airfoil is increased. Increasing an angle of attack increases the strength of the vortices and, thus, increases vortex drag generated by the airfoil.

To reduce the effects of airfoil tip (e.g., wing tip or rotor blade tip) vortices, some known aircraft employ winglets and/or tapered wing tips or rotor blades. However, tapered wing tips and/or rotor blade tips typically require increasing a spanwise length of a wing or rotor blade, which may not be feasible or desirable. For example, a wingspan of an aircraft can be constrained based on dimensional limits and/or regulations imposed by the International Civil Aviation Organization (ICAO), and/or based on physical infrastructure limitations of airports (e.g., the relative sizes of runways, taxiways, gate areas, hangars, etc.). Some winglets taper upwardly (e.g., perpendicular to a chordwise direction) and rearwardly (e.g., in the chordwise direction) to reduce an overall wingspan of the aircraft. However, winglets are not feasible for use with helicopter rotors.

Example vortex reduction apparatus disclosed herein can be implemented with airfoils including aircraft wings, helicopter rotor blades, and/or any other airfoils. Specifically, example vortex reduction apparatus disclosed herein can couple to (e.g., extend from) terminating ends of the airfoil to reduce and/or eliminate vortex drag or downwash phenomenon that may otherwise occur when the airfoil is moving in a forward direction and an imbalance of pressure between an lower surface of the airfoil and an upper surface of the airfoil generates lift (e.g., positive lift). For example, vortex reduction apparatus disclosed herein reduce a strength of a vortex shed from a tip of an airfoil, thereby reducing aircraft drag and improving aircraft performance and/or reducing noise.

Example vortex generating apparatus disclosed herein eliminate or substantially reduce vortex drag. Specifically, to reduce or eliminate a strength of a vortex shed from a tip of an airfoil, example vortex reduction apparatus disclosed herein generate or induce rotational airflow (e.g., generate a vortex) at a tip of an airfoil in a rotational direction that is opposite to a rotational direction of an offending vortex generated at the tip of the airfoil (e.g., a tip vortex, a shed vortex, etc.) during flight. For example, if a rotational direction of the tip or shed vortex at the tip of the airfoil is in a counterclockwise direction, an example vortex reduction apparatus disclosed herein generates airflow having a rotational direction in a clockwise direction. Thus, the induced rotational direction provided by example vortex reduction apparatus disclosed herein is opposite to a rotational direction of a tip vortex that forms at an outboardmost portion (e.g., a tip) of an airfoil. In some examples, example vortex reduction apparatus disclosed herein generate a rotational airflow in an opposite direction relative to a tip vortex having a force that is substantially equal to a force of the tip vortex, thereby reducing or eliminating the tip vortex. Thus, in some instances, example vortex generating apparatus disclosed herein provides a rotational airflow to counteract and/or cancel the vortices that form at a tip of an airfoil. As used herein, "substantially equal" means exactly equal or within 10%.

Example vortex reduction apparatus disclosed herein include a housing that couples to a tip of an airfoil (e.g., an outboardmost end of a wing or rotor blade). In some examples, example vortex reduction apparatus disclosed herein are embedded or attached to a tip of an airfoil. Example vortex reduction apparatus disclosed herein define a volute fluid flow passageway between an inlet and an outlet structured to induce a rotational fluid flow in a first rotational direction opposite a second rotational direction of a shed vortex induced at the tip of the airfoil during flight. To form the volute fluid flow passageway, example vortex reduction apparatus disclosed herein include one or more vanes, blades, and/or any other curved or arcuate structure(s) to induce rotational fluid flow through the housing. An example vane disclosed herein can have a spiral profile, a helix profile, a double volute profile, and/or any other shaped volute or structure to impart a rotational velocity to fluid flow passing through a vortex reduction apparatus. In some examples, vortex reduction apparatus can be integrally formed with an airfoil (e.g., a wing or a rotor blade) during manufacture of the airfoil. In examples, vortex reduction apparatus disclosed herein can retrofit airfoils (e.g., wings and/or rotor blades) of existing aircraft.

FIG. 1 illustrates an aircraft 100 that embodies aspect of teachings of this disclosure. The aircraft 100 of FIG. 1 is a commercial aircraft that includes airfoils 102 defining a first wing 104a (e.g., a left-side wing) and a second wing 104b (e.g., a right-side wing) that extend from a fuselage 106. The airfoils 102 include respective vortex reduction apparatus 108a, 108b constructed in accordance with teachings of this disclosure. The vortex reduction apparatus 108a, 108b of the illustrated example are positioned at respective wing tips 110 (e.g., outboardmost ends) of the airfoils 102. The vortex reduction apparatus 108a, 108b reduce or eliminate vortices at the respective wing tips 110 of the airfoils 102 during flight (e.g., landing, take-off, cruise, ascend and descend). In some examples, the aircraft 100 can include a vortex reduction apparatus (e.g., the vortex reduction apparatus 108a and/or 108b) on other surfaces or airfoils of the aircraft 100 including, but not limited to a vertical stabilizer 112, horizontal stabilizers 114, the fuselage 106, engines 116 (e.g., a nacelle), pylons 118, and/or any other surface(s).

Figure 2:
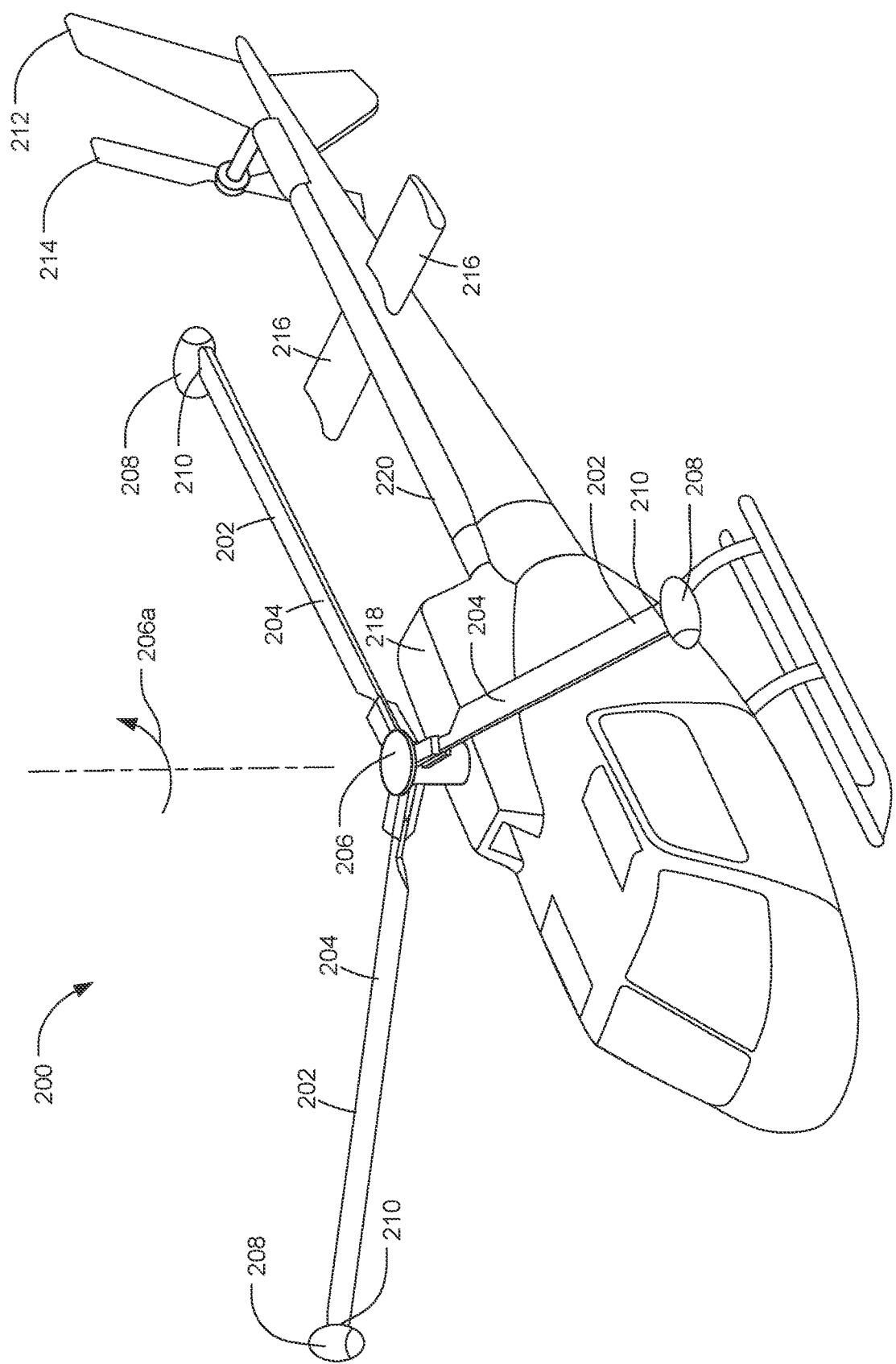
FIG. 2 is an illustration of another example aircraft having a vortex generating apparatus disclosed herein.

FIG. 2 illustrates another aircraft 200 that embodies aspect of teachings of this disclosure. The aircraft 200 of FIG. 2 is a helicopter that includes airfoils 202 defining rotor blades 204 extending from a rotor 206. The airfoils 202 include vortex reduction apparatus 208 constructed in accordance with teachings of this disclosure. The vortex reduction apparatus 208 reduce or eliminate vortices (e.g., a shed vortex) at respective rotor blade tips 210 of the airfoils 202 during flight (e.g., landing, take-off, hover). Thus, the vortex reduction apparatus 208 rotate along with the rotor blades 204 as the rotor 206 rotates the rotor blades 204 in a first rotational direction 206a. In some examples, the aircraft 200 can include vortex reduction apparatus (e.g., one or more of the vortex reduction apparatus 208) on other surfaces or airfoils of the aircraft 200 including, but not limited to a fin 212, a tail rotor 214, horizontal stabilizers 216, an engine compartment 218 (e.g., a nacelle), a tail boom 220, and/or any other surface(s).

The example vortex reduction apparatus (e.g., the vortex reduction apparatus 108a, 108b, 208) disclosed herein are not limited to the aircraft 100, 200 of FIGS. 1 and 2. The vortex reduction apparatus disclosed herein can be implemented with any other example aircraft such as, for example, military aircraft (e.g., an tilt rotor, a jet fighter), drones, transport aircraft and/or any other suitable aircraft.

FIG. 3A is a left side, rear view of an airfoil 300 having a vortex reduction apparatus 302 disclosed herein (e.g., a rear view from an aft end or tail of an aircraft toward a fore end). FIG. 3B is a top view of the airfoil 300 of FIG. 3A. FIG. 3C is a right side, rear view of an airfoil 301 having a vortex reduction apparatus 303 disclosed herein (e.g., a rear view from an aft end or tail of an aircraft toward a fore end). FIG. 3D is a top view of the airfoil 301 of FIG. 3C. The airfoil 300 and the vortex reduction apparatus 302 can implement the first wing 104a (e.g., a left-side wing) of the aircraft 100 or the vortex reduction apparatus 208 of the aircraft 200 of FIG. 2 when the rotor 206 is configured to rotate in the first rotational direction 206a. The airfoil 301 and the vortex reduction apparatus 303 of FIGS. 3C and 3D can implement the second wing 104b (e.g., the right-side wing) of the aircraft 100 of FIG. 1. Additionally, the airfoil 301 and the vortex reduction apparatus 303 of FIGS. 3C and 3D can implement vortex reduction apparatus of the aircraft 200 of FIG. 2 when the rotor 206 is configured to rotate in a second rotational direction opposite the first rotational direction 206a. The airfoil 300 and the vortex reduction apparatus 302 are identical to the airfoil 301 the vortex reduction apparatus 303, except the airfoil 301 and the vortex reduction apparatus 303 mirror the airfoil 300 and the vortex reduction apparatus 302.

Referring to FIGS. 3A-3D, during flight, the airfoil 300, 301 (e.g., the wings 104a, 104b or the rotor blades 204) produces a lift force vector 304 by using energy of freestream airflow 305. To produce the lift force vector 304, pressure on a lower surface 306 (e.g., a high pressure area) of the airfoil 300, 301 is greater than pressure on an upper surface 308 (e.g., a low pressure area) of the airfoil 300, 301. This pressure differential causes air to flow from the high pressure area at the lower surface 306, around a tip 310, and upward to the low pressure area on the upper surface 308. This flow phenomenon results in a lateral flow outward from the lower surface 306 to the upper surface 308 that imparts a rotational velocity to airflow at the tip 310, which produces vortices 312 (e.g., tip vortices) at the tip 310 of the airfoil 300 and vortices 314 (e.g., tip vortices) at the tip 310 of the airfoil 301.

The vortices 312 rotate in a first rotational direction 316 (e.g., a clockwise direction) in the orientation of FIGS. 3A and 3B, and the vortices 314 rotate in a second rotational direction 318 (e.g., a counterclockwise direction) in the orientation of FIGS. 3C and 3D. As the freestream airflow 305 (and vortices 312, 314) roll off a trailing edge 320 of the airfoil 300, 301, the vortices 312, 314 angle downwardly and impart a downward force 322 on the upper surface 308 adjacent the trailing edge 320 of the airfoil 300, 301, which is commonly referred to as downwash. The downwash on the upper surface 308 of the airfoil 300, 301 has a similar effect as bending the lift force vector 304 rearwardly. As a result, the lift force vector 304 is slightly aft of perpendicular to relative airflow, creating a rearward lift component. Thus, such downwash opposes lift, which causes induced drag. The greater a size and strength of the vortices 312, 314 and consequent downwash on a net airflow over the airfoil 300, 301, the greater the amount of induced drag.

The vortex reduction apparatus 302, 303 reduce or eliminate the vortices 312, 314 that form at the tip 310 of the respective airfoils 300, 301. To reduce or eliminate the vortices 312, 314, the vortex reduction apparatus 302 generates or induces rotational airflow at the tip 310 of the airfoil 300, 301 in a rotational direction that is opposite to a rotational direction of a vortex (e.g., a tip vortex) generated at the tip 310 of the airfoil 300, 301. For example, the vortex reduction apparatus 302 of FIGS. 3A and 3B is structured to receive the freestream airflow 305 and generate a rotational airflow 324 (e.g., a counter vortex) in the second rotational direction 318 at the tip 310 of the airfoil 300 (e.g., the counterclockwise direction in the orientation of FIG. 3A). In some examples, the vortex reduction apparatus 302 is structured to generate the rotational airflow 324 having a force that is substantially equal to a force of a tip vortex (e.g., the vortices 312) at the tip 310 of the airfoil 300, thereby reducing or eliminating the tip vortex at the tip 310 of the airfoil 300. Similarly, the vortex reduction apparatus 303 of FIGS. 3C and 3D is structured to receive the freestream airflow 305 and generate a rotational airflow 326 (e.g., a counter vortex) having the first rotational direction 316 at the tip 310 of the airfoil 301 (e.g., the clockwise direction in the orientation of FIG. 3C). In some examples, the vortex reduction apparatus 303 is structured to generate the rotational airflow 326 having a force that is substantially equal to a force of a tip vortex (e.g., the vortices 314) at the tip 310 of the airfoil 301, thereby reducing or eliminating the shed vortex at the tip 310 of the airfoil 301.

FIG. 4A is a left side, rear view of the example airfoil 300 as shown in FIG. 3A. FIG. 4B is a top view of the example airfoil 300 as shown in FIG. 3B. Referring to FIGS. 4A and 4B, the vortex reduction apparatus 302 of the illustrated example is coupled to the tip 310 (e.g., outboardmost end) of the airfoil 300. The vortex reduction apparatus 302 includes a housing 402 defining a volute fluid flow passageway 404 between an inlet 406 defined adjacent a first end 408 of the housing 402 and an outlet 410 defined adjacent a second end 412 of the housing 402 opposite the first end 408. The first end 408 of the housing 402 is positioned adjacent a leading edge 414 of the airfoil 300 and the second end 412 of the housing 402 is positioned adjacent the trailing edge 320 of the airfoil 300. To this end, the inlet 406 is oriented toward a fore direction 401a (e.g., toward the freestream airflow 305 of FIG. 3B) to receive the freestream airflow 305 and the outlet 410 is oriented toward an aft direction 401b. In some examples, a longitudinal axis 416 (e.g., a center axis) of the housing 402 is substantially parallel relative to a tip chord of the airfoil 300. As used herein, substantially parallel means perfectly parallel (e.g., zero degree angle between the central longitudinal axis and the chordwise direction) or approximately parallel (e.g., within 10 percent or 10 degrees of perfectly parallel). In other words, the volute fluid flow passageway 404 defines an axial fluid flow path that is substantially parallel relative to a chordwise direction 400a. In other examples, the longitudinal axis 416 of the housing 402 is positioned at an angle (e.g., a non-parallel angle, an angle between 50 degrees and 80 degrees) relative to the chordwise direction 400a.

To define the volute fluid flow passageway 404 and impart the rotational airflow 324 (FIG. 3A), the vortex reduction apparatus 302 of the illustrated example includes a vane 420 (e.g., a blade). Specifically, the vane 420 is formed in a cavity 422 of the housing 402. The vane 420 extends from an inner surface 424 of the housing 402 defining the cavity 422 toward the longitudinal axis 416 of the housing 402. The vane 420 of the illustrated example has a first end 426 located adjacent the inlet 406 and a second end 428 located adjacent the outlet 410. Additionally, the vane 420 of the illustrated example forms an arcuate (e.g., a spiral) shape that extends at least partially between the first end 408 of the housing 402 and the second end 412 of the housing 402. The vane 420 of the illustrated example is fixed to the housing 402 (e.g., the inner surface 424 of the housing 402). In other words, the vane 420 does not rotate relative to the housing 402. Specifically, the vane 420 does not rotate relative to the housing 402 to generate the rotational airflow 324 (FIG. 3A) through the volute fluid flow passageway 404.

The housing 402 of the illustrated example is a cylindrical body having a uniform outer diameter 430 along a longitudinal length 432 between the first end 408 and the second end 412. Additionally, the inlet 406 of the housing 402 is concentric with the outlet 410. The vane 420 projects from the inner surface 424 of the cavity 422 to define the volute fluid flow passageway 404 through the cavity 422. The vane 420 of the illustrated example is a unitary structure. The vane 420 of the illustrated example provides a spiral profile (e.g., a corkscrew shape). Thus, the vane 420 of the illustrated example is spiral vane. As used herein, a "spiral vane" is a curved structure that winds around the longitudinal axis 416 at continuously varying (e.g., increasing or decreasing) distances from the center axis 416 as the vane 420 extends along the longitudinal length 432 of the housing 402 between the first end 408 and the second end 412 of the housing 402. The vane 420 provides a continuous volute fluid flow passageway 404 between the inlet 406 and the outlet 410. In some examples, the vane 420 includes a plurality of vanes coupled or positioned to provide a continuous volute fluid flow passageway 404 between the inlet 406 and the outlet 410.

A first portion of the vane 420 (e.g., adjacent the inlet 406) has a first surface area that is different (e.g., greater or larger) than a second surface area of a second portion of the vane 420 (e.g., adjacent the outlet 410). As a result, the vane 420 and the housing 402 are structured to provide a non-uniform cross-section between the inlet 406 and the outlet 410. In some examples, a cross-sectional area of the volute fluid flow passageway 404 increases (e.g., continuously, non-continuously, linearly, non-linearly, etc.) from the inlet 406 to the outlet 410. In some examples, a cross-sectional area of the volute fluid flow passageway 404 decreases (e.g., continuously, non-continuously, linearly, non-linearly, etc.) from the inlet 406 to the outlet 410.

The vortex reduction apparatus 302 is a passive device that imparts rotational velocity to fluid flow flowing in (e.g., passing through) the cavity 422 via the vane 420 positioned in the cavity 422. For example, the vortex reduction apparatus 302 utilizes a speed of the freestream airflow 305 intrinsic to a forward velocity and/or blade rotation of an aircraft to induce the rotational velocity to the rotational airflow 324. Thus, the vortex reduction apparatus 302 does not require supplemental or motive power (e.g., a motor, etc.) to generate the rotational airflow 324. In other words, the vortex reduction apparatus 302 does not receive power (e.g., electrical power, hydraulic power, etc.) from an energy source (e.g., a motor, an actuator, etc.).

The vortex reduction apparatus 303 is substantially similar to the vortex reduction apparatus 302 except the vortex reduction apparatus 303 mirrors the vortex reduction apparatus 302. For example, the vane 420 of the vortex reduction apparatus 302 (FIGS. 3A and 3B and FIGS. 4A and 4B) is structured to induce fluid flow through the volute fluid flow passageway 404 in the second rotational direction 318 (FIGS. 3A and 3B). For example, the vane 420 of the vortex reduction apparatus 302 is a left-hand vane. In contrast, the vane 420 of the vortex reduction apparatus 303 (FIGS. 3C and 3D) is structured to induce fluid flow through the volute fluid flow passageway 404 in the first rotational direction 316 (FIGS. 3C and 3D). For example, a vane of the vortex reduction apparatus 303 is a right-hand vane. Therefore, for brevity, the vortex reduction apparatus 303 is not further described.

FIGS. 5-9, 10A, 10B, and 11-13 illustrate other vortex reduction apparatus 500-900 and 1002-1302 disclosed herein. Those components of the vortex reduction apparatus 500-900 and 1002-1302 of FIGS. 5-9, 10A, 10B, and 11-13 that are substantially similar or identical to the components of the vortex reduction apparatus 302 described above and that have functions substantially similar or identical to the functions of those components will not be described in detail again below. Instead, the interested reader is referred to the above corresponding descriptions. To facilitate this process, similar reference numbers will be used for like structures.

Figure 5:
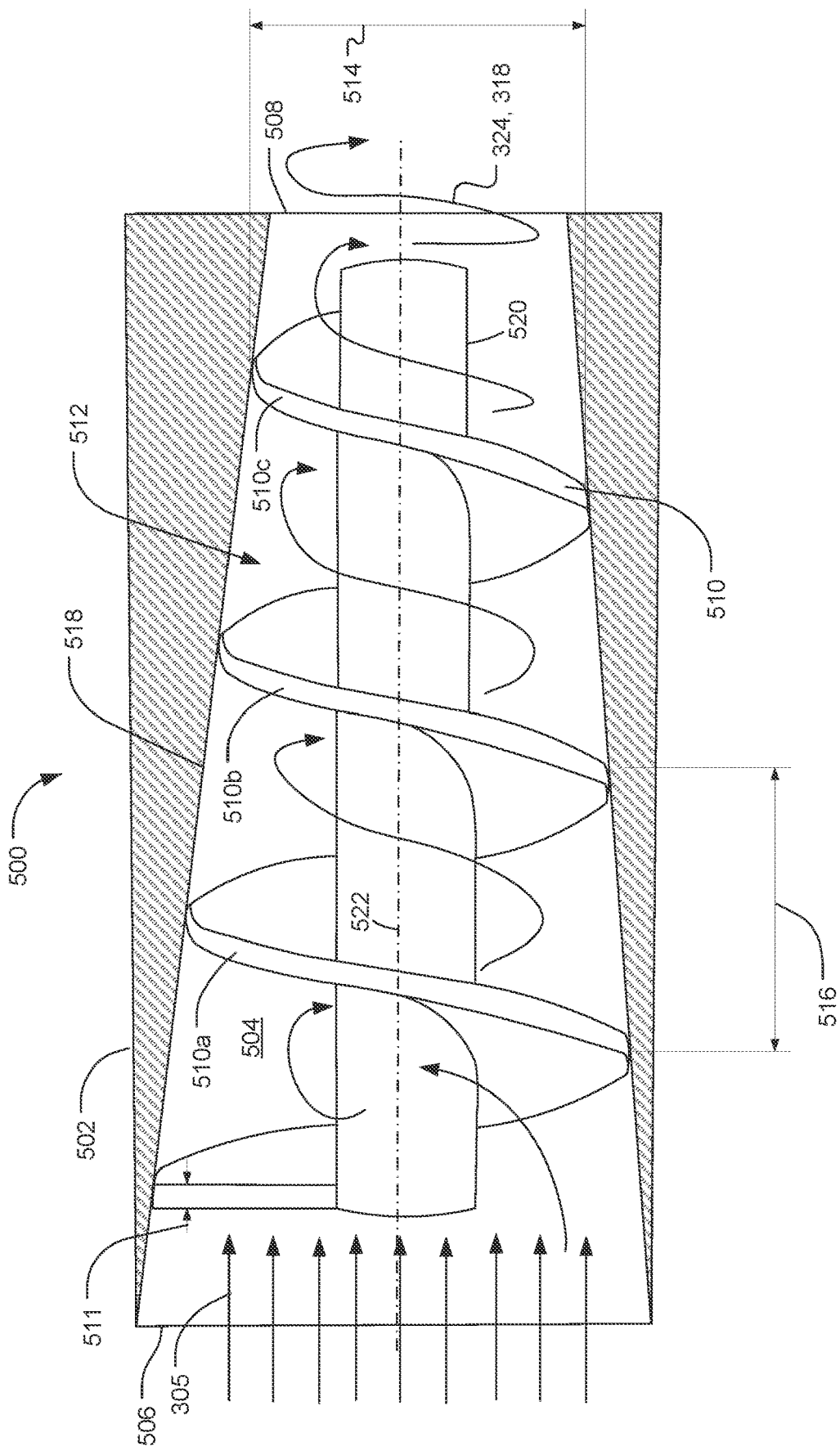
FIGS. 5-9 are cross-sectional views of other example vortex generating apparatus disclosed herein.

FIG. 5 illustrates another vortex reduction apparatus 500 disclosed herein. The vortex reduction apparatus 500 defines a housing 502 having a volute fluid flow passageway 504 between an inlet 506 and an outlet 508. The inlet 506 is concentric with the outlet 508. To provide the volute fluid flow passageway 504, the vortex reduction apparatus 500 of the illustrated example includes a vane 510. The housing 502 is a cylindrical body defining a cavity 512 to receive the vane 510. The vane 510 of the illustrated example is a spiral vane. Thus, an outer diameter 514 of the vane 510 decreases (e.g., gradually, linearly, etc.) from the inlet 506 to the outlet 508. Additionally, the vane 510 of the illustrated example has three revolutions 510a, 510b, 510c. However, in some examples, the vane 510 can have one full revolution (e.g. a single turn), two revolutions, four revolutions, etc. To adjust the number of revolutions and/or spacing between the revolutions 510a, 510b, 510c, a pitch 516 of the vane 510 can be varied (e.g., increased or decreased). The pitch 516 and/or the outer diameter 514 can be varied (e.g., increased or decreased) to adjust a desired parameter (e.g., velocity, pressure, rotational force, etc.) of the rotational airflow 324 (e.g., an induced vortex) exiting the outlet 508. The vane 510 of the illustrated example is a left-hand vane. To achieve a rotational airflow in a first rotational direction (e.g., the rotational airflow 326 in the first rotational direction 316 of FIGS. 3C and 3D), the vane 510 can be configured as a right-hand vane.

The vane 510 of the illustrated example is fixed to the housing 502. For example, the vane 510 does not rotate relative to the housing 502 to induce rotational velocity or the rotational airflow 324. The vane 510 is coupled (e.g., fixed or attached) to an inner surface 518 of the housing 502 defining the cavity 512. Additionally, the vane 510 of the illustrated example is coupled to or supported by (e.g., extends from) a post 520. The post 520 is a cylindrical body that is concentrically aligned with a longitudinal axis 522 of the volute fluid flow passageway 504. In some examples, the housing 502 includes one or more ribs (e.g., a spokes) that extend radially from the post 520 and couple to the inner surface 518 of the housing 502 to support the vane 510 in the cavity 512. In some such examples, the vane 510 can be detached from the inner surface 518. Additionally, the cavity 512 has a varying (e.g., decreasing) profile between the inlet 506 and the outlet 508 to accommodate the spiral profile of the vane 510. In this manner, a cross-sectional area of the vane 510 and/or the volute fluid flow passageway 504 gradually varies (e.g., decreases) between the inlet 506 and the outlet 508. For example, a ratio between a cross-sectional area of the inlet 506 and a cross-sectional area of the outlet 508 can be, for example, 2 to 1, 3 to 1, 4 to 1, etc. The vane 510 can have a thickness 511 to withstand bending forces imparted by the airflow flowing through the volute fluid flow passageway 504.

During flight, the vortex reduction apparatus 500 receives the freestream airflow 305 and induces or imparts a rotational velocity to the freestream airflow 305. Specifically, the volute fluid flow passageway 504 provides the rotational airflow 324 (e.g., a vortex) having the second rotational direction 318 at the outlet 508 of the housing 502 without rotating or moving relative to the housing 502. Additionally, due to the gradually decreasing cross-sectional area of the volute fluid flow passageway 504, the velocity of the rotational airflow 324 is greater than a velocity of the freestream airflow 305 at the inlet 506. Thus, a velocity of fluid flowing through volute fluid flow passageway 504 increases between the inlet 506 and the outlet 508.

The vortex reduction apparatus 500 is a passive device that imparts rotational velocity to fluid flow passing through the cavity 512 via the vane 510 positioned in the cavity 512. For example, the vortex reduction apparatus 500 utilizes the freestream airflow 305 intrinsic to a forward velocity and/or blade rotation of an aircraft to induce the rotational velocity to the rotational airflow 324. Thus, the vortex reduction apparatus 500 does not require supplemental or motive power (e.g., a motor, etc.) to generate the rotational airflow 324.

Figure 6:
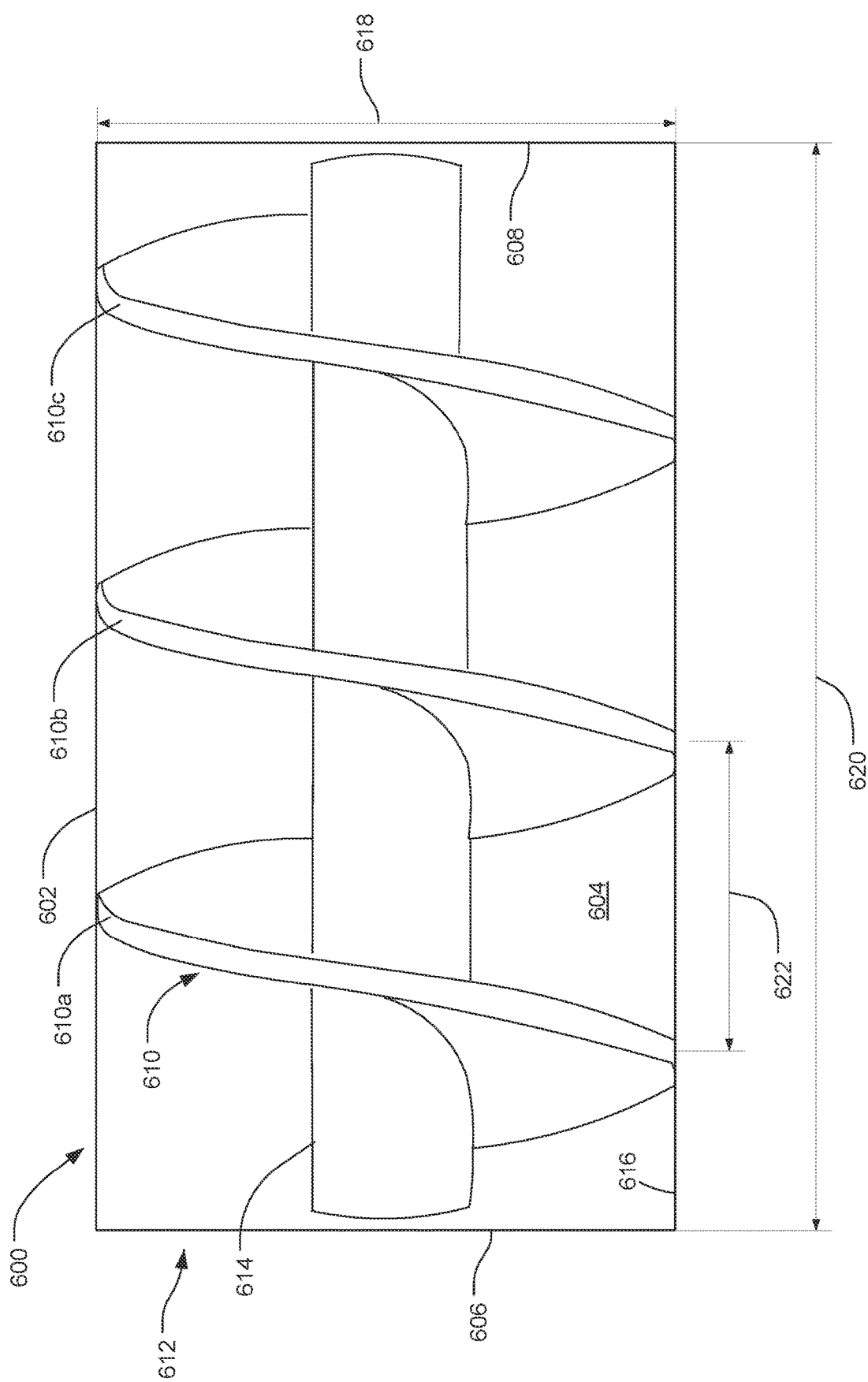

FIG. 6 is another vortex reduction apparatus 600 disclosed herein. The example vortex reduction apparatus includes a housing 602 defining a volute fluid flow passageway 604 between an inlet 606 and an outlet 608. To provide the volute fluid flow passageway 604, the vortex reduction apparatus includes a vane 610 positioned in a cavity 612 of the housing 602. The vortex reduction apparatus 600 includes a post 614 to support the vane 610. The vane 610 of the illustrated example has a helix-shaped profile. For example, the vane 610 is a helicoid. Specifically, the vane 610 and an inner surface 616 defined by the cavity 612 are structured to provide a uniform cross-section between the inlet 606 and the outlet 608. For example, an outer diameter 618 of the vane 610 is uniform or constant between the inlet 606 and the outlet 608. Additionally, the vane 610 of the illustrated example includes three revolutions 610a, 610b and 610c spaced relative to a longitudinal length 620 of the housing 602. The revolutions 610a, 610b and 610c are spaced equidistant along the longitudinal length 620. However, in some examples, the revolutions 610a, 610b and 610c can be spaced apart at different distances along the longitudinal length 620. Additionally, a pitch 622 of the vane 610 can be adjusted (e.g., increased or decreased). In some examples, the vortex reduction apparatus 600 can include one or more of the revolutions 610a, 610b, 610c and/or any number of vanes 610.

Figure 7:
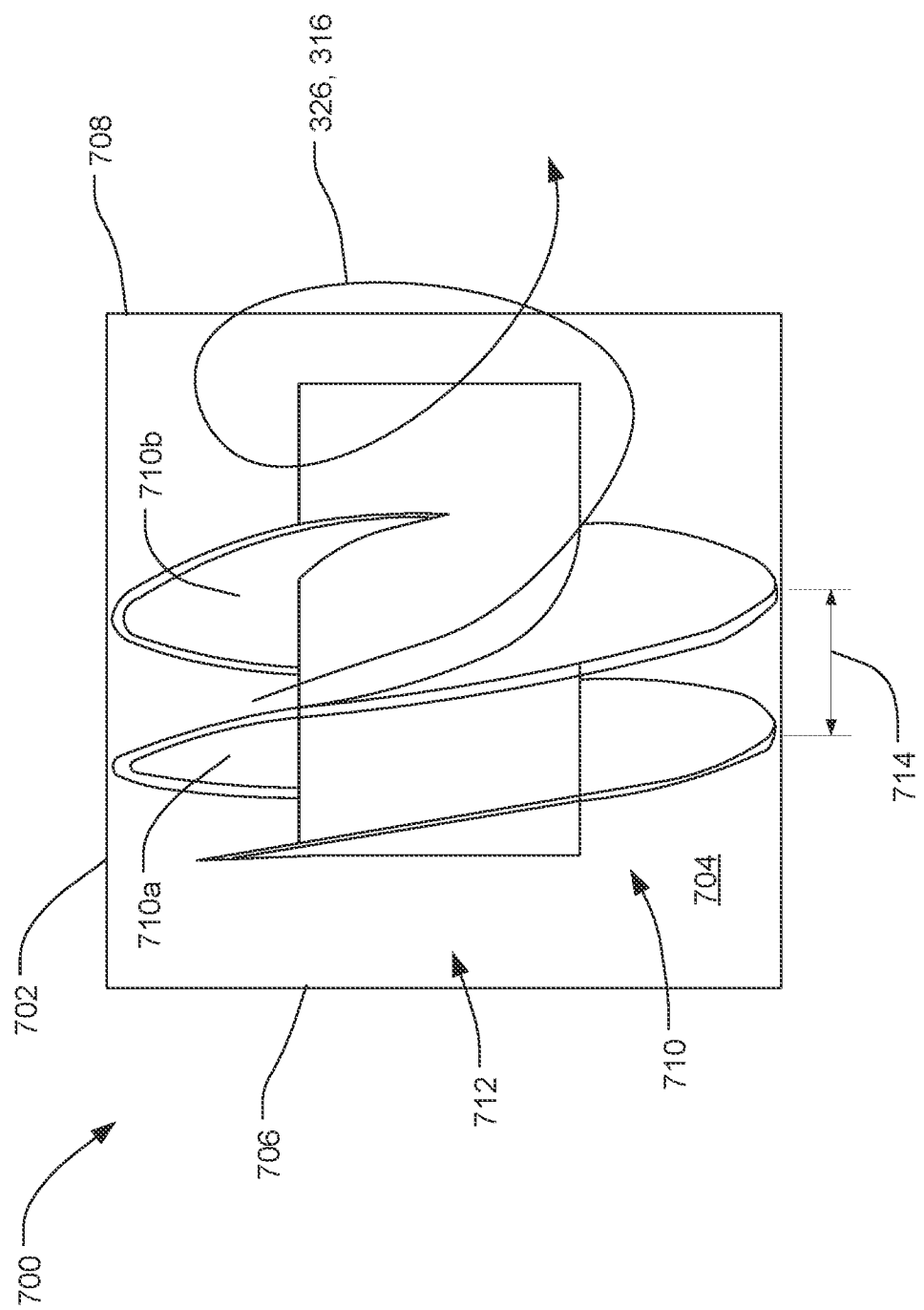

FIG. 7 illustrates another vortex reduction apparatus 700 disclosed herein. The vortex reduction apparatus 700 includes a housing 702 defining a volute fluid flow passageway 704 between an inlet 706 and an outlet 708. To provide the volute fluid flow passageway 704, the vortex reduction apparatus 700 includes a vane 710 positioned in a cavity 712 of the housing 702. The vane 710 of the illustrated example has a helix-shaped profile. However, the vane 710 of the illustrated example has a pitch 714 that is less than a pitch 622 of the vortex reduction apparatus 600 of FIG. 6. Additionally, the vane 710 includes two revolutions 710a and 710b. Further, the vane 710 is a right-hand vane that induces a rotational airflow 326 in a first rotational direction 316.

Figure 8:
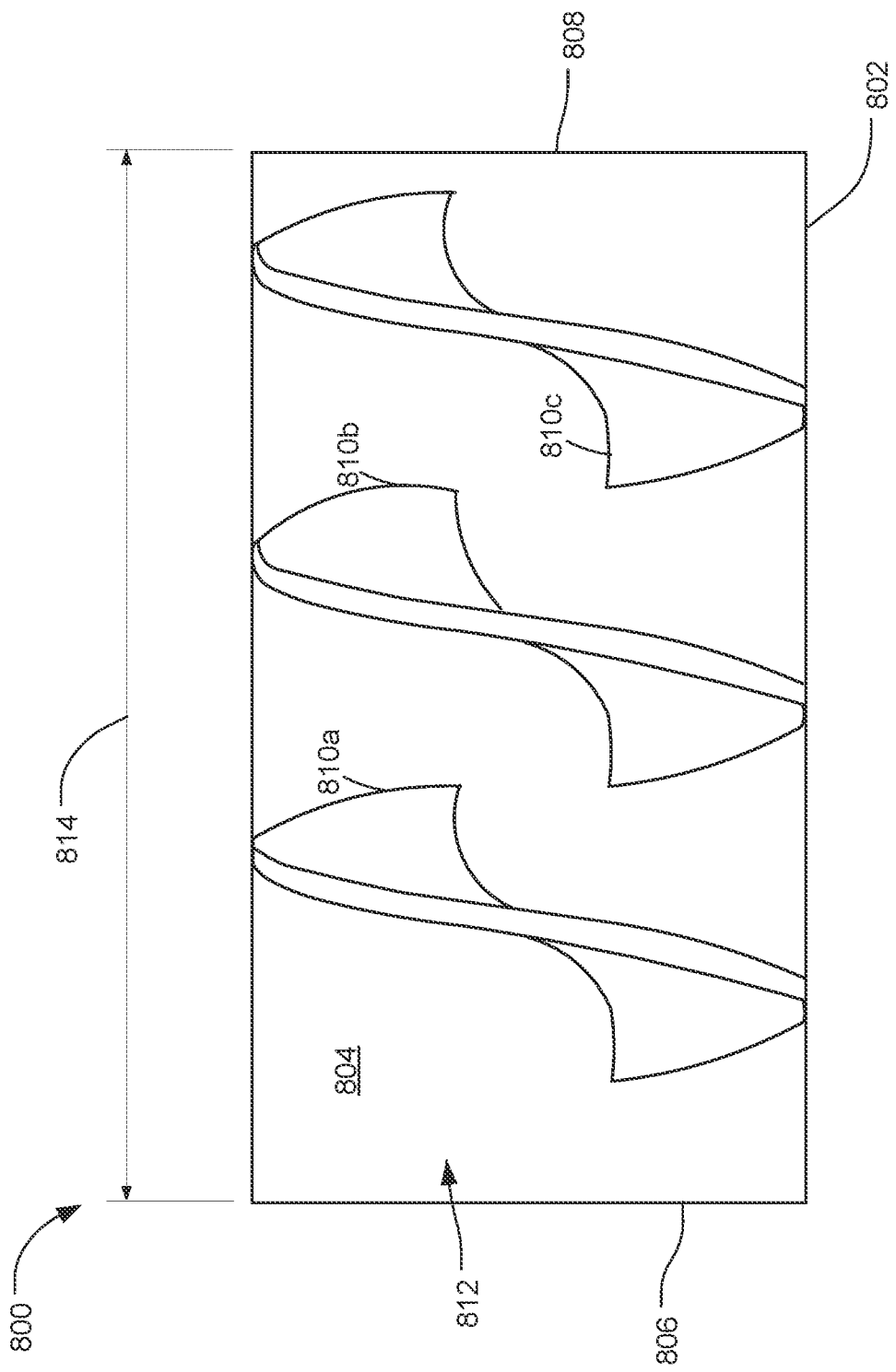

FIG. 8 illustrates another vortex reduction apparatus 800 disclosed herein. The vortex reduction apparatus 800 includes a housing 802 defining a volute fluid flow passageway 804 between an inlet 806 and an outlet 808. To provide the volute fluid flow passageway 804, the vortex reduction apparatus 800 includes a plurality of vanes 810a, 810b and 810c. The vanes 810a, 810b and 810c are positioned in a cavity 812 of the housing 802 and spaced relative to a longitudinal length 814 of the housing 802. The vanes 810a, 810b and 810c are spaced equidistant along the longitudinal length 814. However, in some examples, the vanes 810a, 810b and 810c can be spaced apart at different distances along the longitudinal length 814. The vortex reduction apparatus 800 includes three vanes 810a, 810b and 810c. However, in some examples, the vortex reduction apparatus 800 can include one vane 810a, two vanes 810b, 810c and/or any other number of vanes.

Figure 9:
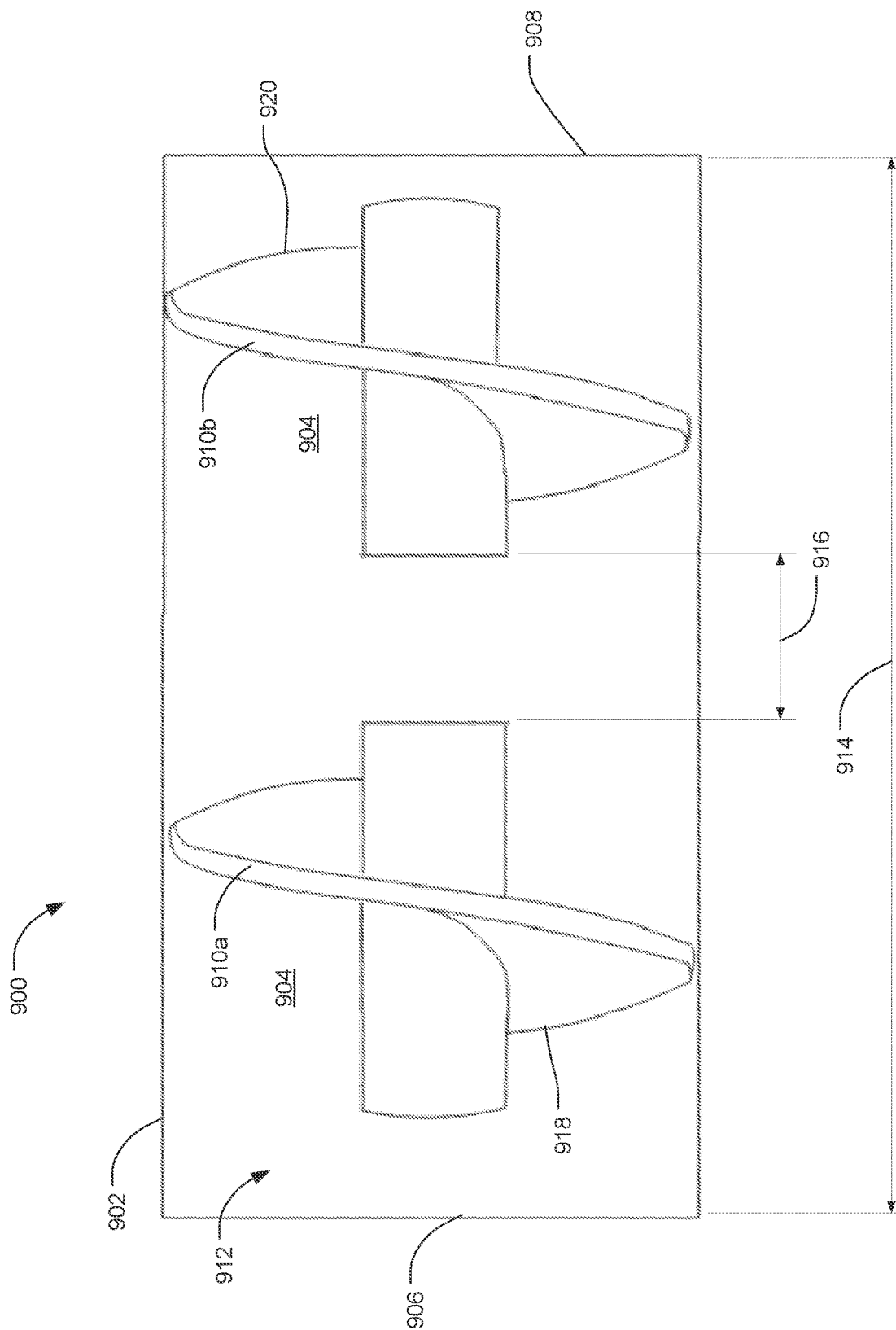

FIG. 9 illustrates another vortex reduction apparatus 900 disclosed herein. The vortex reduction apparatus 900 includes a housing 902 defining a volute fluid flow passageway 904 between an inlet 906 and an outlet 908. To provide the volute fluid flow passageway 904, the vortex reduction apparatus includes a first vane 910a and a second vane 910b positioned in a cavity 912 of the housing 902. The first vane 910a and the second vane 910b of the illustrated example form a double volute. The first vane 910a and the second vane 910b are spaced apart along a longitudinal length 914 of the housing 902 and form a gap 916 therebetween in an axial direction (e.g., a fore-aft direction). Thus, in some examples, a portion of the volute fluid flow passageway 904 can include a non-volute portion (e.g., a straight fluid flow passageway) that does not induce rotational fluid flow positioned adjacent a volute portion of the volute fluid flow passageway 904 that induces rotational fluid flow. In some examples, a first portion (e.g., between the inlet 906 and a midpoint of the longitudinal length 914) includes a vane (e.g., the first vane 910a) and a second portion (e.g., between the midpoint of the longitudinal length 914 and the outlet 908) does not include a vane (e.g., the second vane 910b is omitted). In some examples, a first portion (e.g., between the inlet 906 and a midpoint of the longitudinal length 914) does not include a vane (e.g., the first vane 910a is omitted) and a second portion (e.g., between the midpoint of the longitudinal length 914 and the outlet 908) includes a vane (e.g., the second vane 910b). In some examples, a first end 918 of the first vane 910a can be offset relative to the inlet 906 and/or a second end 920 of the second vane 910b can be offset relative to the outlet 908. In this manner, a portion (e.g., a quarter-length) of the cavity 912 adjacent the inlet 906 and a portion (e.g., a quarter-length) of the cavity 912 adjacent the outlet 908 does not include a vane (e.g., a volute fluid flow passageway).

Figure 10A:
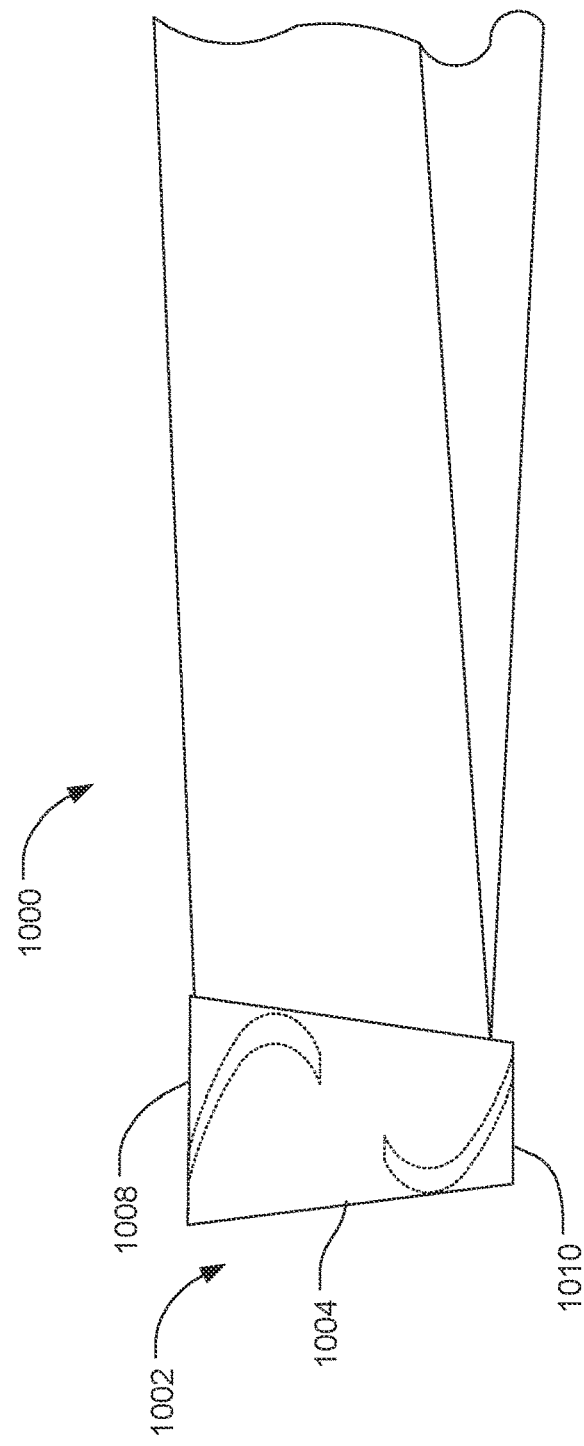
FIG. 10A is a top view of another example airfoil and vortex reduction apparatus disclosed herein.
Figure 10B:
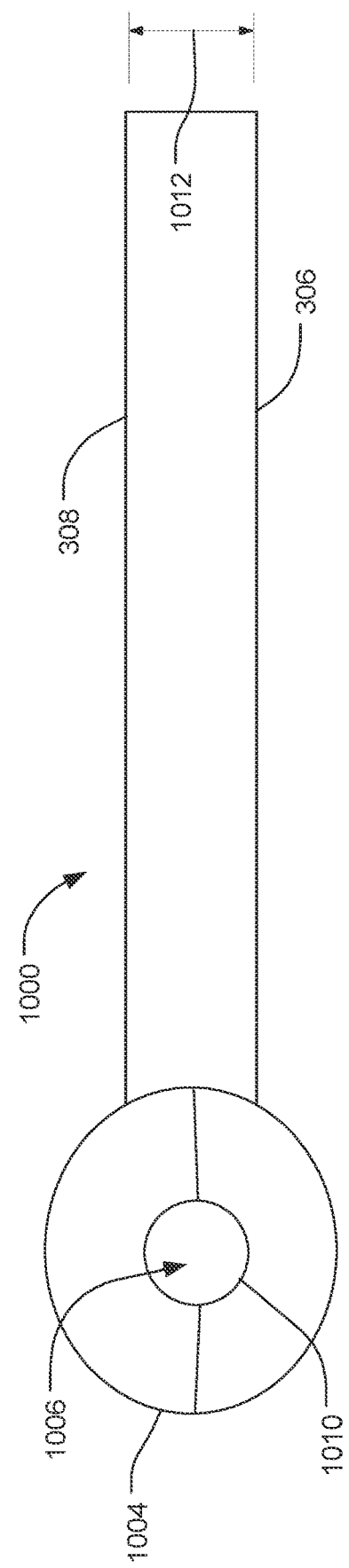
FIG. 10B is a left side, rear view of the example airfoil and vortex reduction apparatus of FIG. 10A.

FIG. 10A is a top view of another airfoil 1000 having another vortex reduction apparatus 1002 disclosed herein. FIG. 10B is a left side, rear view of the airfoil 1000 of FIG. 10A. The vortex reduction apparatus 1002 includes a housing 1004 defining a volute fluid flow passageway 1006 between an inlet 1008 and an outlet 1010 (e.g., defined by one or more vanes disclosed herein). The housing 1004 that has a conical shape (e.g., a tapered profile). For example, the housing 1004 tapers from the inlet 1008 toward the outlet 1010 to reduce an area of the volute fluid flow passageway 1006. Reducing a cross-sectional area of the outlet 1010 relative to a cross-sectional area of the inlet 1008 increases a velocity of the airflow through the volute fluid flow passageway 1006. A ratio between a diameter of the inlet 1008 and a diameter of the outlet 1010 can be, for example, 2 to 1, 3 to 1, 4 to 1, and/or any other ratio. The inlet 1008 and the outlet 1010 of the illustrated example have circular cross-sectional shapes and are concentrically aligned. Additionally, the vortex reduction apparatus 1002 of the illustrated example is not constrained to a dimensional envelope 1012 (e.g., a thickness) of the airfoil 1000. For example, the vortex reduction apparatus 1002 extends beyond a lower surface 306 of the airfoil 1000 and an upper surface 308 of the airfoil 1000.

Figure 11A:
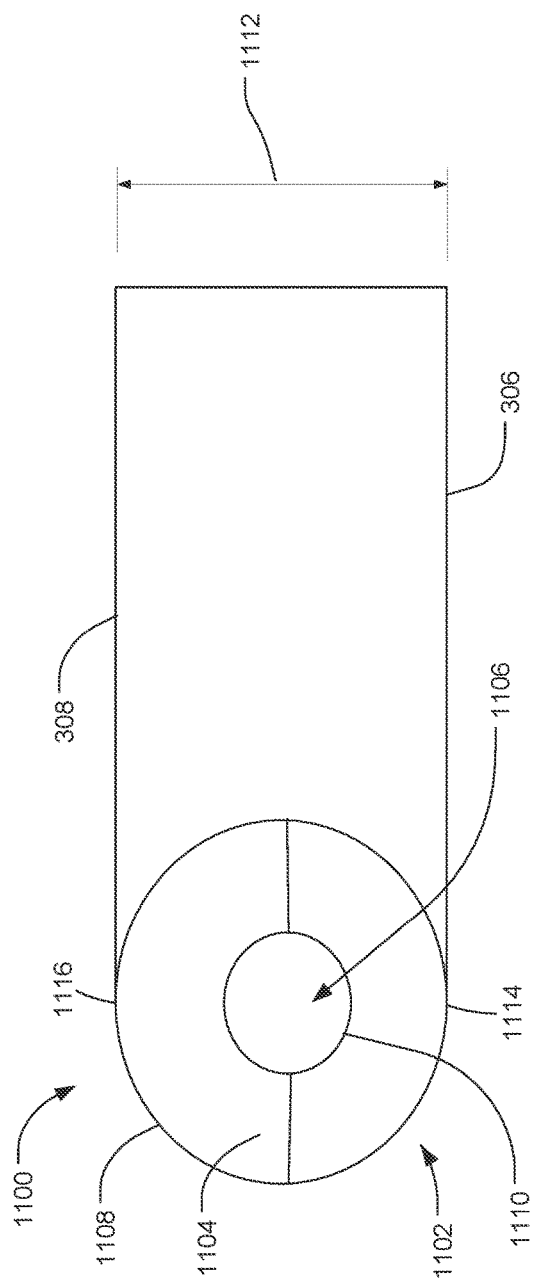
FIG. 11A is a left side, rear view of another example airfoil and vortex reduction apparatus disclosed herein.
Figure 11B:
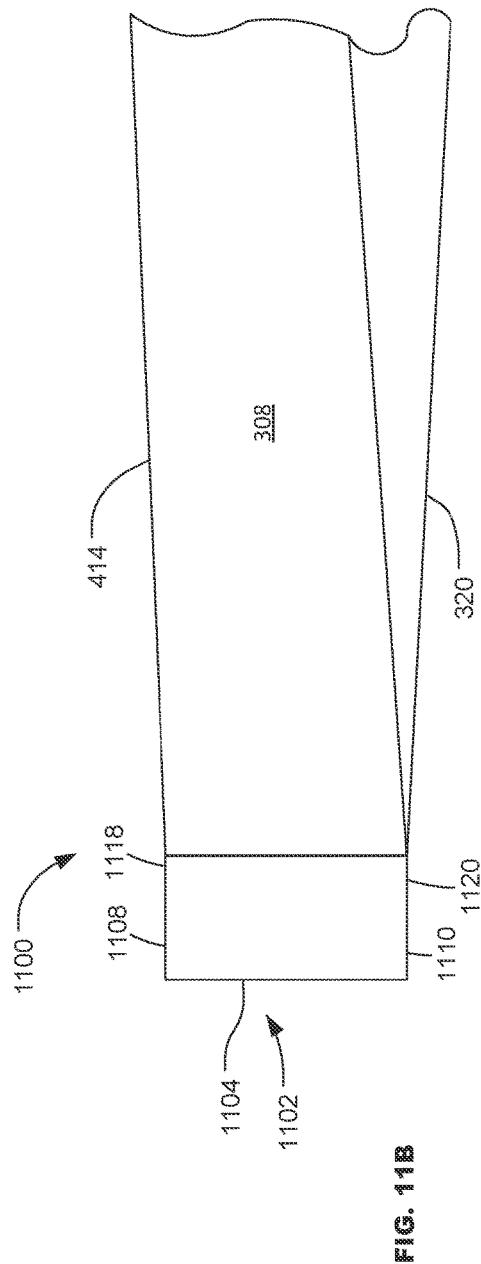
FIG. 11B is a top view of the example airfoil and vortex reduction apparatus of FIG. 11A.

FIG. 11A is left side, rear view of an airfoil 1100 having a vortex reduction apparatus 1102 disclosed herein. FIG. 11B is a top view of the airfoil 1100 and the vortex reduction apparatus 1102 of FIG. 11A. The vortex reduction apparatus 1102 includes a housing 1104 defining a volute fluid flow passageway 1106 between an inlet 1108 and an outlet 1110 (e.g., defined by one or more vanes disclosed herein). The vortex reduction apparatus 1102 of the illustrated example includes a housing 1104 that has a conical shape (e.g., a tapered profile). Additionally, the vortex reduction apparatus 1102 of the illustrated example is confined within an outer mold line of the airfoil surface. For example, the vortex reduction apparatus 1102 is within or confined to a dimensional envelope 1112 (e.g., a thickness) of the airfoil 1100. For example, the vortex reduction apparatus 1102 does not extend beyond a lower surface 306 of the airfoil 1000 and an upper surface 308 of the airfoil 1100. In other words, the vortex reduction apparatus 1102 does not cause a bump-up on an aerodynamic surface of the airfoil 1100. For example, a lowermost surface 1114 of the vortex reduction apparatus 1102 is substantially flush relative to the lower surface 306 of the airfoil 1100 and an uppermost surface 1116 of the vortex reduction apparatus 1102 is substantially flush with the upper surface 308 of the airfoil 1100. Additionally, a first end 1118 of the housing 1104 (e.g., the inlet 1108) aligns with a leading edge 414 of the airfoil 1100 and a second end 1120 of the housing 1104 (e.g., the outlet 1110) aligns with a trailing edge 320 of the airfoil 1100. In some examples, the first end 1118 is offset or recessed relative to the leading edge 414 (e.g., in a direction toward the second end 1120) and/or the second end 1120 is offset or recessed relative to the trailing edge 320 (e.g., in a direction toward the first end 1118).

FIG. 12 is left side, rear view of an airfoil 1200 having a vortex reduction apparatus 1202 disclosed herein. The vortex reduction apparatus 1202 includes a housing 1204 defining a volute fluid flow passageway 1206 between an inlet 1208 and an outlet 1210 (e.g., defined by one or more vanes disclosed herein). In this example, the housing 1204 has a tapered, oval (e.g., elliptical) shape or profile. In other words, an area of the volute fluid flow passageway 1206 has a varying (e.g., decreasing) cross-sectional area from the inlet 1208 to the outlet 1210. Further, the inlet 1208 has an oblong cross-sectional shape (e.g., an oval or elliptical cross-sectional shape) and the outlet 1210 has an oblong cross-sectional shape (e.g., an oval or elliptical cross-sectional shape). Additionally, the outlet 1210 is offset relative to the inlet 1208. For example, the outlet 1210 is positioned eccentrically relative to the inlet 1208. In some examples, the inlet 1208 and/or the outlet 1210 can have a circular cross-sectional shape and/or any other shape(s). For example, one of the inlet 1208 or the outlet 1210 can have an oval cross-sectional shape and the other one of the inlet 1208 or the outlet 1210 can have a circular cross-sectional shape. In some examples, the housing 1204 has a straight profile (e.g., a uniform cross-sectional area between the inlet 1208 and the outlet 1210).

FIG. 13 is left side, rear view of an airfoil 1300 having a vortex reduction apparatus 1302 disclosed herein. The vortex reduction apparatus 1302 includes a housing 1304 defining a volute fluid flow passageway 1306 between an inlet 1308 and an outlet 1310 (e.g., defined by one or more vanes disclosed herein). Specifically, the inlet 1308 has an oval or elliptical shape and the outlet 1310 has a circular shape (e.g., oval inlet-to-circular exit). Additionally, the outlet 1310 is eccentric relative to the inlet 1308. However, in some examples, the outlet 1310 is concentric relative to the inlet 1308. In some examples, the inlet 1308 has a circular shape and the outlet has an oval shape.

The foregoing examples of the vortex reduction apparatus 302, 303, 500-900 and 1002-1302 can be employed with an aircraft and/or an airfoil. Although each of the vortex reduction apparatus 302, 303, 500-900 and 1002-1302 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, a vortex reduction apparatus disclosed in accordance with the teachings of this disclosure may have a combination of the features of the vortex reduction apparatus 302, 303, 500-900 and 1002-1302, the housing 402, 502, 602, 702, 802, 902, 1004, 1104, 1204, 1304, the volute fluid flow passageway 404, 504, 604, 704,804, 904, 1006, 1106, 1206, 1306, the vanes 420, 510, 610, 710, 810a-c, 910a-b, the inlets 406, 506, 606, 706, 806, 906, 1008, 1108, 1208, 1308, the outlets 410, 508, 608, 708, 808, 908, 1010, 1110, 1210, 1310 and/or any other component(s), structure(s) or feature(s) disclosed herein.

In some examples, the vortex reduction apparatus 302, 303, 500-900, 1002-1302 are integrally formed with the airfoils 102, 202, 1000, 1100, 1200, 1300 (e.g., the wings 104a, 104b or the rotor blades 204) during manufacturing of the airfoils 102, 202, 1000, 1100, 1200, 1300. In examples, the vortex reduction apparatus 302, 303, 500-900, 1002-1302 disclosed herein can be retrofit to the airfoils 102, 202, 1000, 1100, 1200, 1300 (e.g., the wings 104a, 104b and/or the rotor blades 204 of the aircraft 100, 200). For example, to retrofit an airfoil (e.g., the airfoil 102, 202, 1000, 1100, 1200, 1300) with a vortex reduction apparatus (e.g., the vortex reduction apparatus 302, 303, 500-900, 1002-1302), a vortex reduction apparatus can be coupled (e.g., mounted) to the airfoil (e.g., a structure such as a rib, a beam, a chord, etc.) via one or more fasteners, brackets, and/or any other hardware or structure.

In some examples, the vortex reduction apparatus 302, 303, 500-900, 1002-1302 provide means for generating a vortex to counteract an offending shed vortex. In some examples, the vortex reduction apparatus 302, 303, 500-900, 1002-1302 provide means for reducing or eliminating a shed vortex (e.g., tip vortices). In some examples, the housing 402, 502, 602, 702, 802, 902, 1004, 1104, 1204, 1304 provides means for defining a cavity between an inlet and an outlet. In some examples, the housing 402, 502, 602, 702, 802, 902, 1004, 1104, 1204, 1304, the vanes 420, 510, 610, 710, 810a-c, 910a-b, the inlets 406, 506, 606, 706, 806, 906, 1008, 1108, 1208, 1308, and/or the volute fluid flow passageway 404, 504, 604, 704,804, 904, 1006, 1106, 1206, 1306 provide means for imparting rotational fluid flow to fluid. In some examples, the vanes 420, 510, 610, 710, 810a-c, 910a-b, the inlets 406, 506, 606, 706, 806, 906, 1008, 1108, 1208, 1308 provide means for defining a volute fluid flow passageway.

From the foregoing, it will be appreciated that example vortex generating apparatus have been disclosed that can counteract vortices. Unlike known devices, example vortex generating apparatus disclosed herein can be structurally integrated into an end of a wing or a rotor blade without significantly increasing a wingspan of an aircraft. Example vortex generating apparatus disclosed herein can include variously shaped inlet and outlet openings including for example, circular openings, oval openings and/or any other shaped openings. Example inlet and outlet openings of example vortex generating apparatus disclosed herein can be concentrically aligned or eccentrically aligned. In some examples, vortex generating apparatus disclosed herein can be confined within an outer mold line of an airfoil surface. In some examples, an example inlet can be aligned with a leading edge of an airfoil and an example outlet of the vortex reduction apparatus can be aligned with a trailing edge of an airfoil. An example housing of an example vortex generating apparatus disclosed herein can have a straight profile or a tapered profile. In some examples, the vortex reduction apparatus is embedded in an outboardmost portion (e.g. a tip) of an airfoil. In some examples, the housing of the vortex reduction apparatus defines a cavity that passes unobstructed from a leading edge to a trailing edge. In some examples, the vortex reduction apparatus disclosed herein is a passive device that imparts a rotational velocity to airflow passing through the cavity. To induce rotational airflow, example vortex reduction apparatus disclosed herein employ one or more fixed volute vanes (e.g., protruding from an inner surface of the cavity). Example vortex reduction apparatus disclosed herein employ air speed intrinsic to a forward velocity of an aircraft and/or blade rotation and do not require supplemental power to induce rotational velocity to the airflow.

In some examples, a vortex reduction apparatus includes a housing to couple to a tip of an airfoil. The housing defines a volute fluid flow passageway between an inlet and an outlet. The volute fluid flow passageway is structured to induce a rotational fluid flow in a first rotational direction opposite a second rotational direction of a shed vortex induced at the tip of the airfoil during flight.

In some examples, the volute fluid flow passageway includes a vane formed in a cavity of the housing.

In some examples, the vane extends from an inner surface of the housing defining the cavity toward a longitudinal axis of the volute fluid flow passageway In some examples, the vane is fixed to the housing.

In some examples, the vane does not rotate relative to the housing.

In some examples, the vane includes a plurality of vanes spaced along a longitudinal length of the volute fluid flow passageway between the inlet and the outlet.

In some examples, the vane extends along at least a portion of a longitudinal length of the housing between the inlet and the outlet.

In some examples, the volute fluid flow passageway defines an axial fluid flow path having a longitudinal axis that is substantially parallel relative a tip chord of the airfoil.

In some examples, a center of the inlet is coaxial with a center of the outlet.

In some examples, a center of the inlet is offset relative to a center of the outlet.

In some examples, the volute fluid flow passageway is tapered between the inlet and the outlet such that a cross-sectional area of the inlet is greater than a cross-sectional area of the outlet.

In some examples, the housing has at least one of an oblong cross-sectional shape or a circular cross-sectional shape.

In some examples, the airfoil is a wing of a commercial aircraft.

In some examples, the airfoil is a rotor blade of a helicopter.

In some examples, a vortex reduction apparatus includes a housing to couple to an outboardmost portion of an airfoil. The housing defines a cavity between a first end of the housing and a second end of the housing. One or more volute vanes are positioned in the cavity and at least partially extending between the first end and the second end of the housing. The vortex reduction apparatus to impart a rotational velocity to airflow flowing in the cavity by employing a speed of airflow intrinsic to at least one of a forward velocity of the airfoil or a blade rotation of the airfoil without receiving power from an energy source.

In some examples, the one or more volute vanes are fixed to an inner surface of the housing defined by the cavity.

In some examples, the one or more volute vanes do not rotate relative to the housing.

In some examples, the housing is embedded in the outboardmost portion of the airfoil.

In some examples, a vortex reduction apparatus includes means for defining a cavity between an inlet and an outlet. The vortex reduction apparatus includes means for imparting rotational fluid flow to fluid flowing through the means for defining the cavity between the inlet and the outlet. The means for imparting rotational fluid flow to induce a rotational flow fluid in a first rotational direction opposite to a second rotational direction of a tip vortex induced at a tip of an airfoil during flight.

In some examples, the means for imparting rotational fluid flow includes means for defining a volute fluid flow passageway.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A vortex reduction apparatus for use with an airfoil, the vortex reduction apparatus comprising:
   a housing to couple to a tip of the airfoil, the housing including an inlet, an outlet, and an inner surface, the inlet to be oriented toward a fore direction of the airfoil to receive freestream airflow, the outlet to be oriented toward an aft direction of the airfoil, the inner surface extending from the inlet to the outlet, the inner surface defining a cavity; and
   a volute vane located within the cavity and defining a volute fluid flow passageway extending along a longitudinal length of the housing between the inlet and the outlet, the volute vane including a first end located adjacent the inlet and a second end located adjacent the outlet, the volute vane configured to induce a rotational fluid flow in a first rotational direction opposite a second rotational direction of a shed vortex induced at the tip of the airfoil during flight.

2. The vortex reduction apparatus as defined in claim 1, wherein the volute vane extends from the inner surface toward a longitudinal axis of the cavity.

3. The vortex reduction apparatus as defined in claim 2, wherein the volute vane is fixed to the housing.

4. The vortex reduction apparatus as defined in claim 2, wherein the volute vane does not rotate relative to the housing.

5. The vortex reduction apparatus as defined in claim 1, wherein the volute vane includes a plurality of volute vanes located within the cavity and spaced along the longitudinal length of the housing between the inlet and the outlet.

6. The vortex reduction apparatus as defined in claim 1, wherein the volute fluid flow passageway defines an axial fluid flow path having a longitudinal axis that is substantially parallel relative a tip chord of the airfoil.

7. The vortex reduction apparatus as defined in claim 1, wherein a center of the inlet is coaxial with a center of the outlet.

8. The vortex reduction apparatus as defined in claim 1, wherein a center axis of the inlet is laterally offset relative to a center axis of the outlet.

9. The vortex reduction apparatus as defined in claim 1, wherein the inner surface is tapered between the inlet and the outlet such that a cross-sectional area of the inlet is greater than a cross-sectional area of the outlet.

10. The vortex reduction apparatus as defined in claim 1, wherein the housing has at least one of an oblong cross-sectional shape or a circular cross-sectional shape.

11. The vortex reduction apparatus as defined in claim 1, wherein the housing is a cylindrical body having a uniform outer diameter along a longitudinal length extending from a first end of the housing adjacent the inlet to a second end of the housing adjacent the outlet.

12. The vortex reduction apparatus as defined in claim 1, further comprising a post located within the cavity and configured to support the volute vane, the post concentrically aligned with a longitudinal axis of the volute fluid flow passageway, the volute vane coupled to and extending radially from the post.

13. An aircraft, comprising:
   an airfoil having a tip; and
   a vortex reduction apparatus, the vortex reduction apparatus including:
      a housing coupled to the tip of the airfoil, the housing including an inlet, an outlet, and an inner surface, the inlet oriented toward a fore direction of the airfoil to receive freestream airflow, the outlet oriented toward an aft direction of the airfoil, the inner surface extending from the inlet to the outlet, the inner surface defining a cavity; and
      a volute vane located within the cavity and defining a volute fluid flow passageway extending along a longitudinal length of the housing between the inlet and the outlet, the volute vane configured to induce a rotational fluid flow in a first rotational direction opposite a second rotational direction of a shed vortex induced at the tip of the airfoil during flight.

14. The aircraft as defined in claim 13, wherein the volute vane includes a first end located adjacent the inlet and a second end located adjacent the outlet.

15. The aircraft as defined in claim 13, wherein the vortex reduction apparatus further includes a post located within the cavity and configured to support the volute vane, the post concentrically aligned with a longitudinal axis of the volute fluid flow passageway, the volute vane coupled to and extending radially from the post.

16. The aircraft as defined in claim 13, wherein the aircraft is a fixed-wing aircraft and the airfoil is a wing of the fixed-wing aircraft.

17. The aircraft as defined in claim 13, wherein the aircraft is a rotary-wing aircraft and the airfoil is a rotor blade of the rotary-wing aircraft.

18. The aircraft as defined in claim 13, wherein the housing is confined within an outer mold line of the airfoil.

19. The aircraft as defined in claim 13, wherein the housing is confined within a thickness of the airfoil, the thickness defined by an upper surface and a lower surface of the airfoil.

20. The aircraft as defined in claim 13, wherein a lowermost surface of the housing is substantially flush with a lower surface of the airfoil, an uppermost surface of the housing is substantially flush with an upper surface of the airfoil, a first end of the housing aligns with a leading edge of the airfoil, and a second end of the housing aligns with a trailing edge of the airfoil.

\* \* \* \* \*